May 24, 1966  C. S. TAYLOR  3,252,224
WHEEL ALIGNMENT TESTING EQUIPMENT
Filed March 25, 1963  4 Sheets-Sheet 1
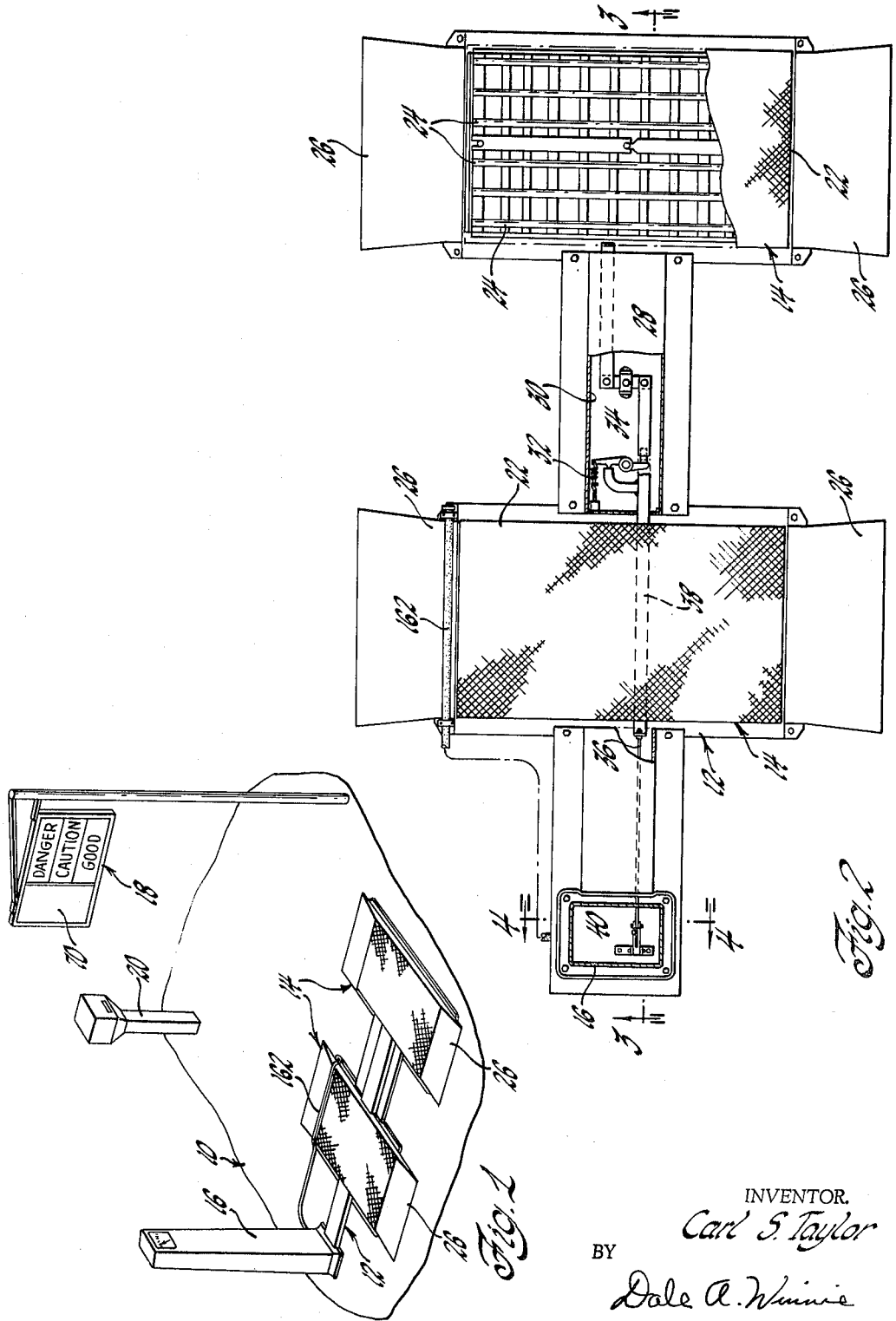
INVENTOR.
Carl S. Taylor
BY
Dale A. Winnie
ATTORNEY May 24, 1966  C. S. TAYLOR  3,252,224
WHEEL ALIGNMENT TESTING EQUIPMENT
Filed March 25, 1963  4 Sheets-Sheet 2
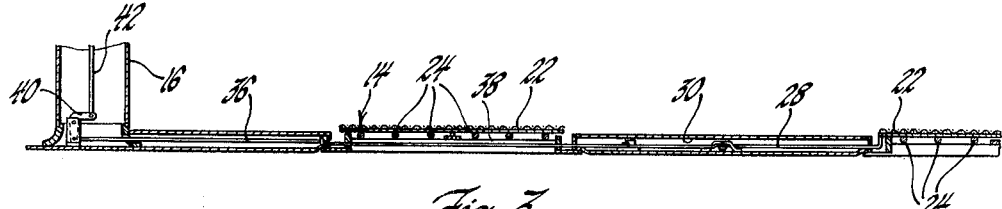
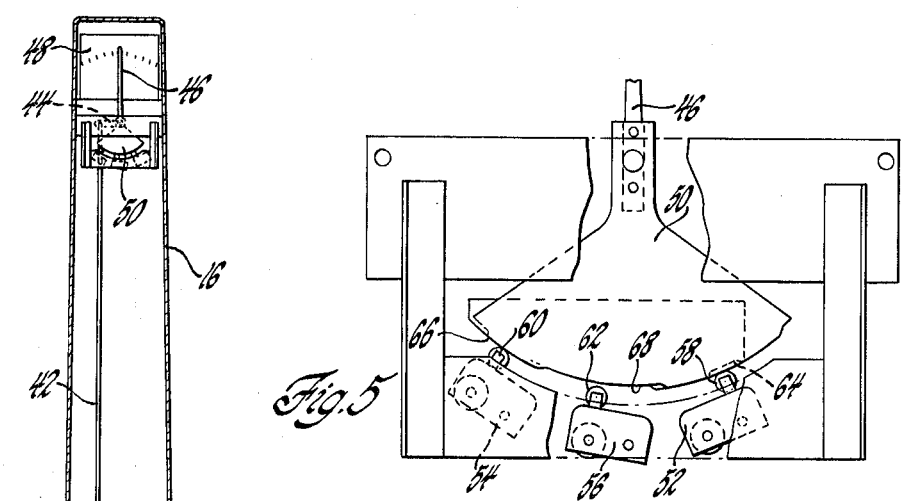
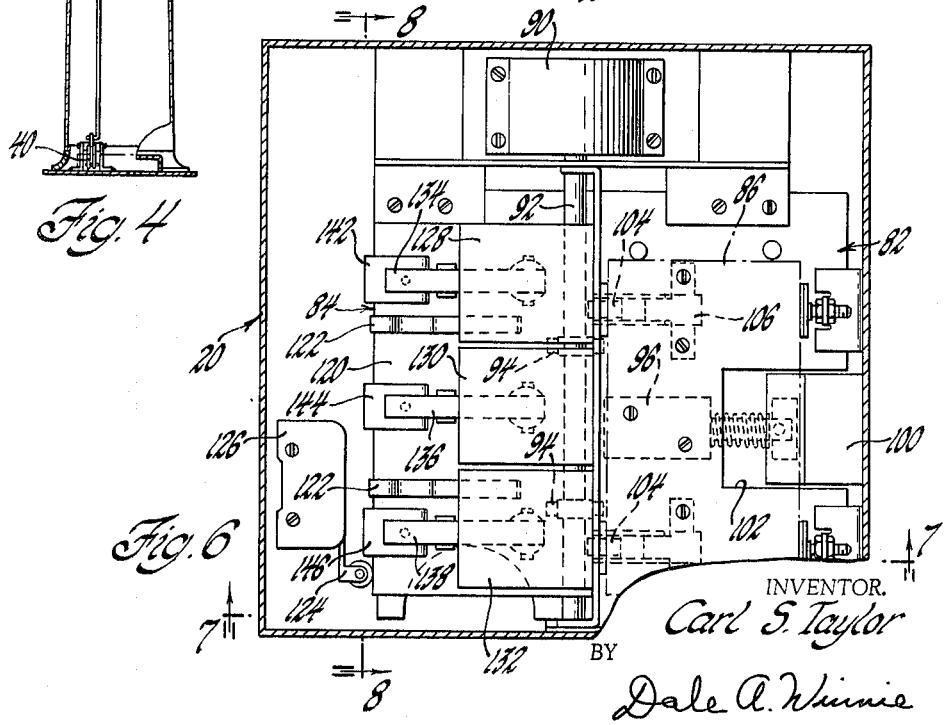
INVENTOR.
Carl S. Taylor
BY
Dale A. Winnie
ATTORNEY May 24, 1966    C. S. TAYLOR    3,252,224
WHEEL ALIGNMENT TESTING EQUIPMENT
Filed March 25, 1963    4 Sheets-Sheet 3

INVENTOR.
Carl S. Taylor
BY
Dale A. Winnie
ATTORNEY

May 24, 1966  C. S. TAYLOR  3,252,224
WHEEL ALIGNMENT TESTING EQUIPMENT
Filed March 25, 1963  4 Sheets-Sheet 4
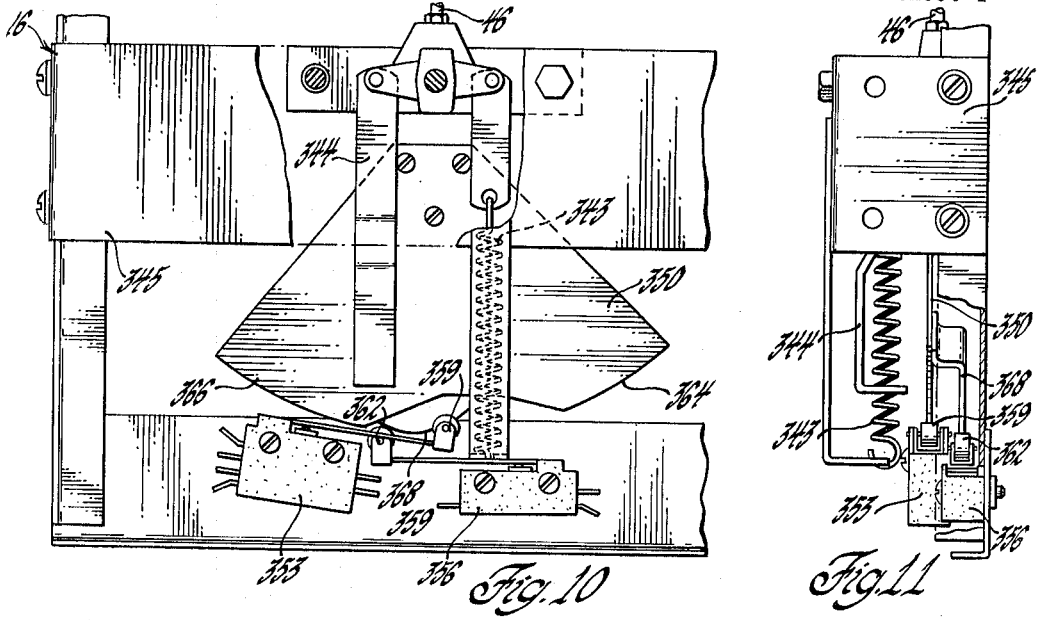
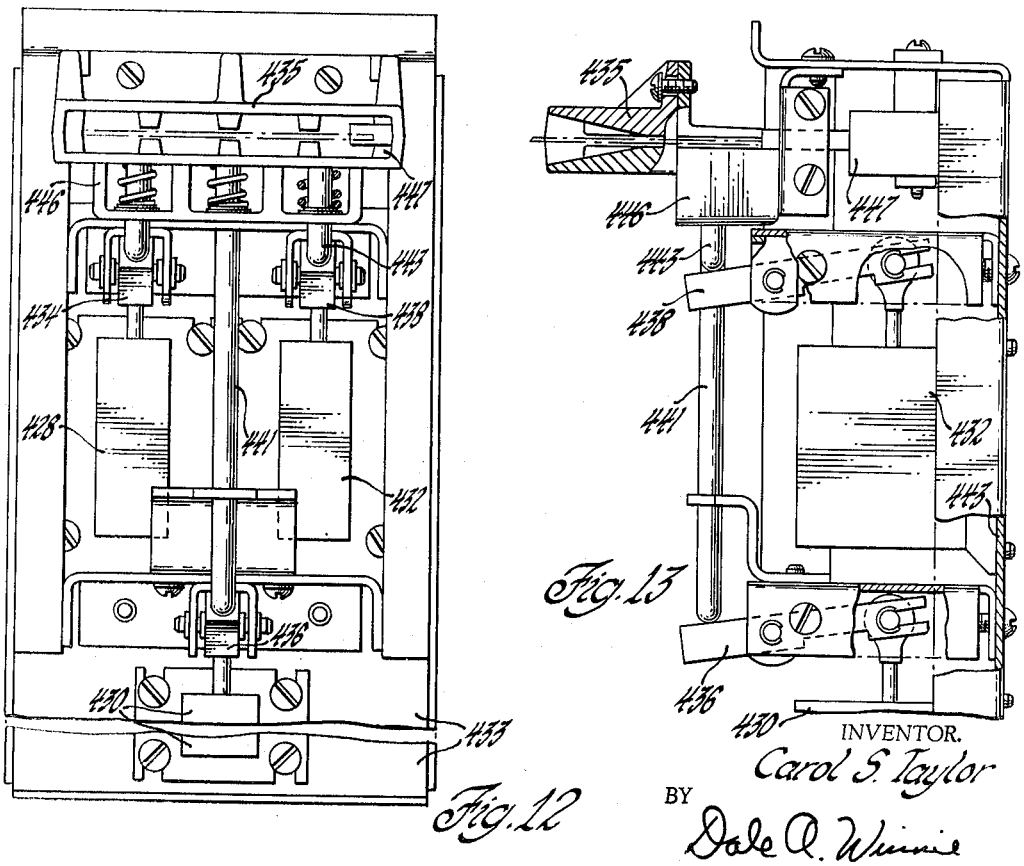
INVENTOR.
Carol S. Taylor
BY
Dale A. Winnie
ATTORNEY

United States Patent Office 3,252,224
Patented May 24, 1966

3,252,224
WHEEL ALIGNMENT TESTING EQUIPMENT
Carl S. Taylor, Springfield, Ill., assignor to Dura Corporation, Oak Park, Mich., a corporation of Michigan
Filed Mar. 25, 1963, Ser. No. 267,658
12 Claims. (Cl. 33—203.12)

This invention relates to wheel alignment equipment and more particularly to automatic wheel alignment testing equipment for use with motor vehicles.

Motorists seldom are aware of any misalignment of the wheels of their motor vehicles when the condition first arises and until an exaggerated condition exists. Safety inspection records indicate that an appreciable number of all motor vehicles traveling the highway are in need of wheel alignment service but the problem is to bring the matter to the attention of a motorist and to impress upon them the seriousness of the matter.

Wheel alignment problems are principally due to shock loads or wear in the front wheel suspension and steering system. The condition normally requires checking camber, caster, king pin or ball-joint inclination, toe and an additional check of the turning radius on all cars with independent front suspension system and on vehicles, principally trucks, wtih conventional axles.

Such a detailed inspection requires time due to the case required and the importance of even slight misalignment which may later become more serious. Needless to say motorists are not prone to take the time for such a detailed inspection and means for making a quick safety check for wheel alignment problems are sorely needed.

It is an object of this invention to provide wheel alignment testing equipment suitable for safety inspection purposes.

It is an object of this invention to provide wheel alignment testing equipment which is reasonably inexpensive and adaptable for use in service areas without special provisions therefor.

It is also an object of this invention to provide wheel alignment testing equipment which will accurately test motor vehicles and dramatically present the test results to motorists for their consideration.

Another object of this invention is to provide equipment which is fully or semi-automatic and requires no special service attention.

It is an object of this invention to provide testing equipment which is operated automatically on the passage of a motor vehicle through the testing zone or area.

A further object of this invention is to provide automatic wheel alignment testing equipment which is fast and efficient in operation, economical in cost and installation and suitably durable and compact in arrangement to be attractive in appearance for ready commercial acceptance.

These and other objects and advantages will be more apparent upon a reading of the following specification having reference to a preferred embodiment of this invention and with particular reference to the accompanying drawings wherein:

FIGURE 1 is a perspective illustration of the wheel alignment testing equipment of this invention as proposed for use in a service facility area.

FIGURE 2 is a top plan view of a part of the wheel testing equipment of this invention showing certain parts broken away to better illustrate the structural and operational details thereof.

FIGURE 3 is a cross-sectional view through the wheel testing apparatus shown by FIGURE 2 as seen in the plane of line 3—3 and looking the direction of the arrows thereon.

FIGURE 4 is a cross-sectional view of the pedestal unit shown by FIGURE 2 as seen in the plane of line 4—4 and looking in the direction of the arrows thereon.

FIGURE 5 is an enlargement of a detailed feature shown by FIGURE 4.

FIGURE 6 is an open top plan view of the wheel alignment test recording device.

Figure 7:
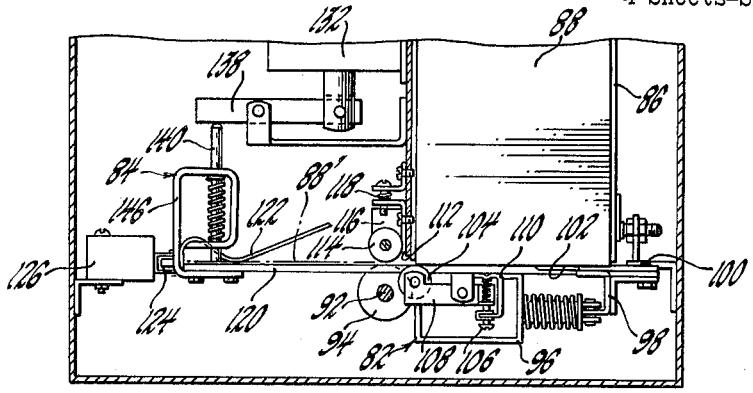
FIGURE 7 is a cross-sectional side view of the wheel alignment test recording device of FIGURE 6 as seen in the plane of line 7—7 thereon and looking in the direction of the arrows.

The equipment shown by the drawings represents an installation for measuring the side slip of vehicle wheels in feet per mile as they pass over a responsive apparatus and which visually and physically records the extent of side slip as a measure of a good, passable or dangerous wheel alignment condition.

Referring to the drawings in further detail, and particularly FIGURE 1, the wheel alignment testing equipment 10 includes alignment responsive or checking apparatus 12 comprising laterally spaced tread plates or like means 14 over which the vehicle wheels to be tested must pass and a pedestal unit 16. In addition, a visual indicator 18 is provided for the motorist and a wheel alignment test data recording device 20 is provided to supply a punched card for the service attendant to present to the motorist.

The alignment responsive apparatus 12, as mentioned, includes the laterally disposed tread plates 14 suitably spaced to receive adjacent pairs of vehicle wheels thereover. The tread plate members 14 include wobble plates 22 which are mounted to afford limited lateral freedom by means of roller members 24 provided thereunder.

The wobble plates 22 may be mounted flush with the road surface over which the vehicle travels or may be provided in a surface installation as shown. In the latter instance they will include wheel ramps 26 on opposite sides of the wobble plates 22 to enable travel across the tread plates.

The wobble plates 22 are interconnected by a suitable linkage 28 housed within a covered passageway 30 between the two wheel receptive tread plates. The plate connecting linkage 28 is counterbalanced by a spring 32 through a fulcrum connection 34. A connecting rod 36 provides a mechanical connection between a link member 38 of the interconnecting linkage 28 and a wheel alignment indicator within the pedestal 16.

The pedestal 16 includes a bell crank link 40 engaged to the connecting rod 36 and having another connecting rod or link 42 engaged thereto and operative of a lever arm 44 engaged to a pivotally mounted indicator needle or pointer 46. The indicator or pointer 46 travels across a calibrated scale 48 to give a visual reading of the wheel alignment condition at the time a vehicle passes over the tread plates 14.

Further indication of the wheel alignment condition represented by the side slip transmitted through the tread plates 14 is obtained through use of a cam surfaced disk 50 engaged to the indicator or pointer 46. Suitable switches 52, 54 and 56 are mounted within the pedestal and include cam follower switch arms 58, 60 and 62 respectively which ride on cam surfaces 64, 66 and 68 provided on the cam surfaced disk 50.

Any movement of the cam surface disk too slight to register any serious misalignment will activate the switch 52, greater rotation of the disk 50 will activate the switch 54 and any serious deflection of the pointer and rotation of the disk 50 will activate the third switch 56.

FIGURES 10 and 11 show another mechanism for operating the required signal switches.

A more simple cam surfaced disk 350 is used and includes cam surfaces 364, 366 and 368. The cam surfaces 364 and 366 are disposed in the same plane of reference and are disposed for engagement by the follower switch arm 359 of the control switch 353. The other cam surface 368 is disposed for engagement by the switch arm 362 of the control switch 356.

The control switch 353 is a double pole double throw switch and serves double duty; thereby eliminating a third control switch. This arrangement also means that one of the "cam" circuits is always activated and eliminates the need for adjustable cams and cam ramps as in the other system.

The disk operating mechanism is shown to include a cross arm connection 344 to which the tread plate connecting rod or link 42 is secured. It also includes a calibration spring 343 engaged to the other end of the cross arm 344 and anchored to the housing 345 within which the indicator apparatus is disposed.

As will subsequently be further explained, the switches 52, 54 and 56, or 353 and 356 as the case may be, are operative of a circuitry interconnected with the visual indicator 18. This includes an illuminated sign 70 having illuminated areas 72, 74 and 76 which respectively indicate a good wheel alignment condition, an approaching problem and a dangerous condition indicating that wheel alignment correction is advisable.

The same operative circuitry, which will later be described, is also interconnected with the recording device 20.

Figure 8:
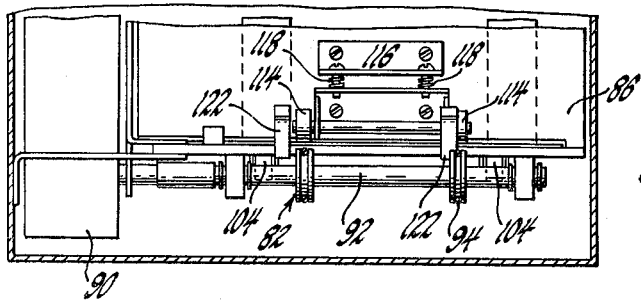
FIGURE 8 is another cross-sectional view through the wheel alignment testing device shown by FIGURE 6 and seen in the plane of line 8—8 thereon.

The recording device 20 is shown by FIGURES 6–8 to include a card storage and feeding apparatus 82 and a card receiving and punching mechanism 84.

The card storage and feeding apparatus 82 includes a card holding enclosure 86 in which is stacked a supply of cards 88. A motor 90 is connected to a shaft 92 which includes feed rollers 94 intended to carry one of the cards 88 from the storage enclosure 86 to a recording position immediately next adjacent thereto.

A solenoid 96 is attached to the bottom of the card holding enclosure 86 and is connected to member 98 which is guided on the bottom of the card case and includes an indexing part 100 received in an open slot 102 provided therein. The indexing part 100 registers with the back edge of the bottom card in the stack and when the solenoid 96 is activated pushes it into engagement with the feed rollers 94.

A pair of rollers 104 are mounted in brackets 106 secured to the bottom of the card case and are disposed on lever arms 108 which ahe biased by springs 110 so that they close a gate opening 112 in the base of the card enclosure 86. The rollers 104 yield to the pressure on the back edge of the bottom card by the indexing member 100 to allow the single card to pass through the opening. The card then passes under roller 114 mounted in a fixture 116 on the face of the card case and which includes spring means 118 biasing the rollers in light engagement with the card and the card in turn in engagement with the feed rollers 94.

The single card 88′, shown in phantom outline in FIGURE 7, is conveyed over a receptive punch plate 120 into spring clips 122 where it is held in position to receive wheel alignment test information. In such position it engages the switch arm 124 of switch means 126 and cuts off the motor 90 and solenoid 96 which are connected thereto.

The card punching mechanism 84 includes solenoids 128, 130, and 132 mounted over the punch plate 120 and operatively connected through rocker arms 134, 136 and 138 to simple hole punches 140 mounted in brackets 142, 144 and 146 on the edge of the punch plate. The punches 140 and their respective solenoids are spaced along the length of the punch plate 120. When any one of the punches 140 is activated it works the card on the punch plate in an area thereon indicating good, questionable or poor wheel alignment, as the test indicates.

Whenever a card is withdrawn from the recording device 20, the switch 126 activates the motor 90 and indexing solenoid 96 to feed another card into position. Thus, a card is always in position to receive the wheel alignment test data.

A semi-automatic type of recording device is shown by FIGURES 12 and 13.

In this device ther eis no provision for card storage and the operation of the card punching mechanism is activated by separate insertion of a card to be punched into the device. However, the punching information is stored in the device much in the same manner as with the recording device just described.

Solenoids 428, 430 and 432 are mounted on a backing plate 433 below a card receptive head 435. They are staggered and spaced one below the others for more compact arrangement. Each solenoid is operatively connected through a rocker arm 434, 436 and 438, respectively, to a simple type hole punch 440, 441 or 443 extending through a suitable alignment bracket 46 including punch retracting spring means.

A simple switch device 447 is disposed for actuation by a card to be punched. When a card is properly inserted in the card head 435, the circuit is completed to activate the appropriate solenoid for the proper punch or is made ready for other solenoid activating control means such as a manual switch.

Figure 9:
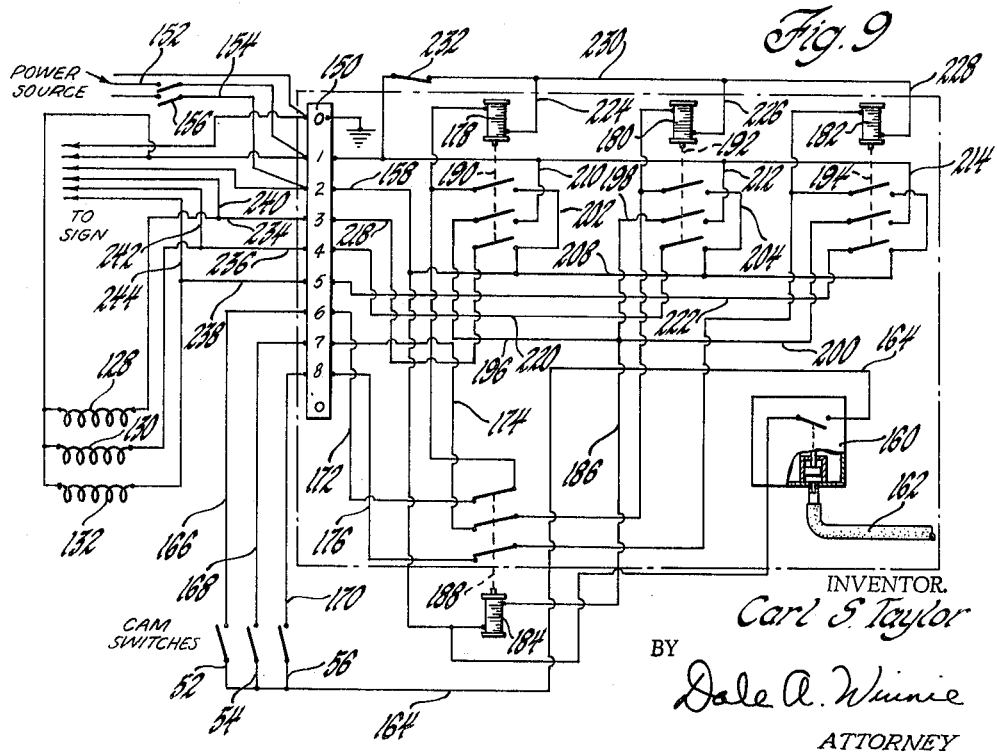
FIGURE 9 is a schematic diagram of the electrical circuitry of the wheel alignment testing equipment of the preferred embodiment of this invention.

Referring now to FIGURE 9:

The electrical circuit for the wheel alignment testing equipment 10 includes a terminal block 150 having terminal posts 1–8 and a ground connection as indicated by the approprate symbol. A source of electrical power is connected to the terminal block 150 through the active leads 152 and 154, engaged to terminal posts 1 and 2, and a switch 156 is provided in the lead 154 to enable shutting off the whole electrical system.

A power lead 158 is connected between terminal post 2 and a pressure switch 160 which is controlled by an air hose 162, or like means, extended across the path of vehicle travel as shown in FIGURES 1 and 2. This switch control is provided to activate and then quickly cut off the system after the initial reading, and as necessary to preclude interference from subsequent traffic through the test area, including the rear vehicle wheels, as will subsequently be better appreciated.

The pressure switch 160 is in turn connected by lead 164 to the cam switches 52, 54 and 56. They are in turn connected by leads 166, 168 and 170 to terminal posts 6–8, respectively, and from there by leads 172, 174 and 176 to the solenoid coils 178, 180 and 182 of relay switches later identified.

A solenoid coil 184 is provided in a lead 186 connected to lead 158 which extends between its terminal post and the pressure switch 160. This coil actuates multiple switch means 188 in the circuit lines 172, 174 and 176 and serves to break the cam switch connection to the respective relay coils 178, 180 and 182. The electrical connection 186 is to one of the switch arms of the multiple switch means 190, 192 and 194, which are controlled by the relay coils 178, 180 and 182, via lines 196, 198 and 200 respectively.

The multiple switch means 190, 192 and 194 each include an alternate connection 202, 204 and 206, respectively through a common lead 208 engaged to the terminal post 2, for energizing the relay coils 178, 180 and 182. They also include connections 210, 212 ad 214 through a common lead 216 to the terminal post 1 for energizing the coil 184. They further include connections 218, 220 and 222 with terminal posts 3–5 respectively and which serve other purposes later described.

The relay coils 178, 180 and 182 are further connected through respective connections 224, 226 and 228 to a common lead 230 which includes a switch 232 and is engaged to terminal post 1.

The electrical system thus far described operates as follows:

The air hose 162 is placed at the leading edge of one of the tread plates 22 over which the vehicle wheels being checked are required to pass. Accordingly, the air pressure switch 160 will be actuated at the moment of maximum lateral movement of the tread plate members.

As the vehicle wheel passes over the air hose 162 the air pressure switch 160 is actuated. At the same time, the proper cam switch 52, 54 or 56 has been closed in accord with the wheel alignment condition of the vehicle being tested. When the pressure switch is activated the circuit is completed momentarily and sufficiently to energize the holding circuit of one of the relay solenoids 178, 180 or 182. This completes the circuit including the relay coil 184, which in turn opens the switch 188, and breaks the cam switch circuit. Thus, the air pressure switch 160 must be activated by a vehicle to initiate the test and affect the reading sought but is immediately blocked from the circuit thereafter to prevent actuation by the rear wheels or other vehicular traffic until the system is reset.

The test signal initiated through one of the cam switches 52, 54 and 56 passes through its respective relay switch 190, 192 or 194, across the terminal post 3, 4 or 5 and through one of the connections 234, 236 or 238 with one of the punch solenoids 128, 130 or 132, respectively. Other leads 240, 242 and 244 connect to the visual sign for appropriate illumination of the proper test reading area thereof.

From the foregoing description it should be apparent that the wheel alignment testing equipment of this invention operates as follows:

When the wheels of a motor vehicle pass over the wobble plates 22, the amount of side slip movement will be mechanically conveyed to and indicated on the calibrated dial 48. The indicator pointer 46 in turn will rotate the cam surfaced disc 50 which will activate one of the cam switches 52, 54 or 56.

The maximum movement of the cam disc 50 occurs just before the vehicle wheels leave the wobble plates 22 and at that instant the wheels will engage the signal hose 162 and activate the pressure switch 160. This completes the electrical circuit to the cam switches and therethrough to one of the relay coils 178, 180 or 182 for actuation of one of the relay switches 190, 192 or 194.

Whichever relay switch is activated in turn completes the circuit to a corresponding section of the visual sign 18 to dramatically show the alignment condition found by the test to the vehicle operator. At the same time one of the punches 140 is activated in the recording device 20 and a permanent record is made on a suitably labelled card to show the wheel alignment condition.

Alternately, with the semi-automatic card punching device, a card is inserted in the recorder, closing the switch and completing the circuit to the appropriate solenoid of one of the punches.

The indicator lights in the sign 18 will stay on until the electrical circuit is interrupted as by manually actuating the switch 232 or having it operated by a time-delay mechanism (not shown). The automatic card punching apparatus might likewise remain active or be timed separately or with the rest of the system for inactive stand-by service.

Although the alignment responsive apparatus 12, that is the wobble plates 22 and indicator dial in the pedestal 16, are able to receive another vehicle and make a wheel alignment determination immediately, the visual recording and punch card apparatus retain the first test data and are not receptive thereto until reset manually or by timedelay means as mentioned.

I claim:

1. Apparatus for checking vehicle wheel alignment and comprising, means for checking the alignment condition of a wheel on a vehicle as the vehicle wheel passes thereover, means for indicating the alignment condition of the vehicle wheel, and means for recording the indicated alignment condition of said last means, said recording means being operatively connected to said indicating means, and means operatively provided between said checking and said indicating means for successively connecting and disconnecting said checking and indicating means in the course of the passage of a single wheel over said checking means for precluding subsequent wheel passage interference with the determinations made thereby.

2. Apparatus for checking vehicle wheel alignment and comprising;

mechanical means for checking the alignment condition of a wheel on a vehicle as the vehicle wheel passes thereover, electrical means for indicating the alignment condition of the vehicle wheel and including switch means operatively connected to the mechanical checking means for controlling the operation of said means for indicating, a source of electrical power, and control means for connecting said power source through said switch means to said indicating means following the closing of said switch means by said checking means, in contrast to prior thereto, to avoid sparking in the closing of switch means under power, said control means being disposed for actuation by the vehicle wheel checked immediately following the passage thereof over said alignment checking means.

3. Apparatus for checking vehicle wheel alignment and comprising;

mechanical means for checking the alignment condition of a wheel on a vehicle as the vehicle wheel passes thereover, electrical means for indicating the alignment condition of the vehicle wheel and including switch means operatively connected to the mechanical checking means for controlling the operation of said means for indicating, a source of electrical power, and means provided between said power source and said switch means and operatively connected to said checking means for electrically connecting said power source to said switch means following the actuation of said switch means by said checking means, in contrast to prior thereto, to avoid sparking in the actuation of said switch means under power.

4. The improvement apparatus of claim 3, said switch means including multiple switches selectively actuated by said mechanical means and operative of different parts of said indicating means.

5. The improvement apparatus of claim 3, said mechanical checking means being adapted to both close and open said switch means, and said control means being operative between the closing and opening of said switch means.

6. The apparatus of claim 1, said recording means being automatically responsive to said indicating means for recording the wheel alignment condition indicated thereby prior to disconnection of said indicating means from said checking means.

7. The apparatus of claim 1, said recording means being subsequently and manually operative for recordation of said indicated wheel alignment condition.

8. The apparatus of claim 1, said recording means being subsequently and automatically operative for recordation of said indicated wheel alignment condition.

9. The apparatus of claim 1, said indicating means including plural cam switch activated electrical circuits having each thereof operative for different wheel alignment conditions.

10. The apparatus of claim 9, including;
   means for operatively activating said electrical circuits immediately preceding the disconnection of said indicating means from said checking means.

11. The apparatus of claim 1,
   said indicating means including a pivotal pointer having a cam surfaced member operative therewith,
   cam follower switch means engaging said cam surfaced member,
   and electrical circuits including said cam follower switch means operatively connected to said recording means for transmitting wheel alignment data thereto.

12. In vehicle wheel alignment testing equipment including laterally movable means for receiving a vehicle wheel in engagement therewith and for checking the alignment condition thereof as it passes thereover,
   said equipment having visual indicator means operatively connected to and positioned by said checking means,
   the improvement comprising;
   record card punching means disposed apart from said checking means and operatively connected thereto for making a permanent record of the alignment condition of a wheel checked thereby,
   said card punching means including an electrical circuit having circuit making switch means disposed for physical engagement and actuation by said visual indicator means,
   means provided next adjacent said laterally movable means on the side thereof from which a wheel is received after passing thereover and operatively connected in said electrical circuit for successively making and breaking the electrical circuit to said switch means,
   and means operatively connected to said card punching means for holding the latter in said electrical circuit following the breaking of said circuit to said switch means and for subsequent actuation of said card punching means when desired and without wheel passage and like interference therewith.

References Cited by the Examiner

UNITED STATES PATENTS

| | | | |
|---|---|---|---|
| 1,487,759 | 4/1924 | Skinner | 33—203.14 |
| 1,890,218 | 12/1932 | Duby | 33—203.14 |
| 1,988,327 | 1/1935 | Musselman | 33—203.14 X |
| 2,313,627 | 3/1943 | Cooper | 346—14 |
| 2,479,768 | 8/1949 | Myer | 346—17 X |
| 2,598,599 | 5/1952 | Pleasance | 33—203.13 |

ROBERT B. HULL, *Primary Examiner.*

ISAAC LISANN, W. D. MARTIN, JR.,
*Assistant Examiners.*